Dec. 3, 1957   J. REPARON   2,814,910
PACKING CASE FOR A BULB GLASS
Filed Jan. 4, 1954   2 Sheets-Sheet 1

Dec. 3, 1957  J. REPARON  2,814,910
PACKING CASE FOR A BULB GLASS
Filed Jan. 4, 1954  2 Sheets-Sheet 2

United States Patent Office 2,814,910
Patented Dec. 3, 1957

2,814,910

PACKING CASE FOR A BULB GLASS

Johannes Reparon, Leerdam, Netherlands, assignor to "Naamloze Vennootschap Vereenigde Glasfabrieken (United Glassworks)," Schiedam, Netherlands, a limited liability company under the law of the Netherlands Application January 4, 1954, Serial No. 402,027

8 Claims. (Cl. 47—37)

This invention relates to packing cases more particularly for bulb glasses wherein hyacinths are grown.

Such bulb glasses are adapted to receive a bulb in the top part thereof, the rest of the glass to be filled with water.

The whole should then be kept in relative darkness until the bud is grown out about 8 cm. above the bulb. In order to obtain a beautifully developed flower it is of great importance that exactly at this phase of the growth the bulb glass with the bulb is brought in daylight.

It is an object of the present invention to provide a packing case for the bulb glass that can be used further as a growing container wherein the bulb is sufficiently excluded from daylight, and that allows an easy check for the moment at which the glass with the bulb is to be put in full daylight.

A further object of the invetnion is to provide for simple means to transform the package from a "shipping case" shape, wherein it serves the purpose of protecting the bulb glass during transport, storing and handling, to the shape of a container for growing a bulb in the glass in the dark having indicator properties for the moment at which the bulb should be brought in daylight.

These and other desirable features of the invention will be made apparent by the description of some illustrative embodiments thereof when considered in connection with the accompanying drawing, in which.

Figure 1:
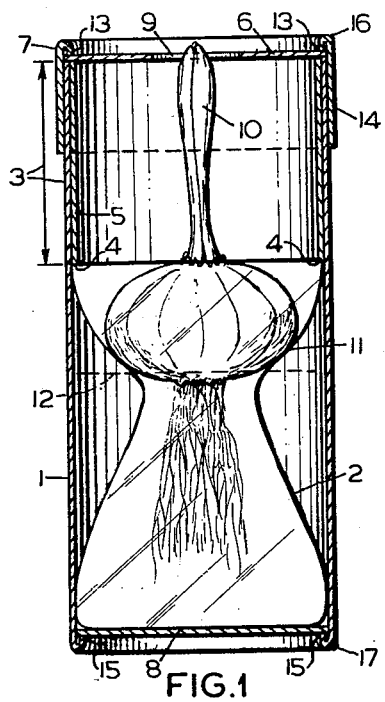
Fig. 1 is a vertical section along the axis of a first embodiment of the invention.
Figure 2:
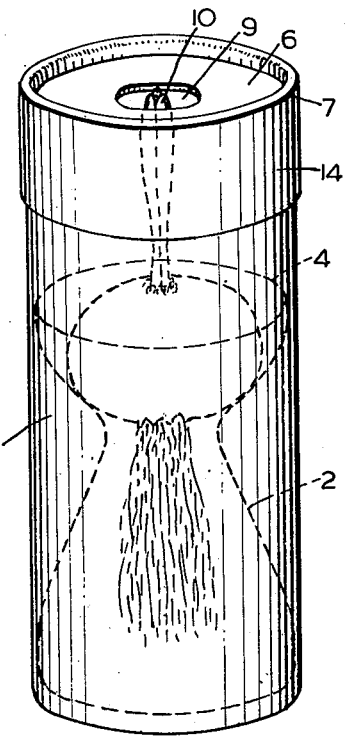
Fig. 2 is a perspective view of the packing case according to Fig. 1.

Referring now first to Figs. 1 and 2, the box that may be made of cardboard is indicated by 1. This box encloses a bulb glass 2 shown in side view in Fig. 1 and in dotted lines in Fig. 2.

The cylindrical side wall of the box projects over a distance of about 8 cm. indicated by an arrow 3 above the upper rim 4 of the bulb glass 2. The bulb glass is prevented from moving vertically in the box on transport by a cylinder 5 fitting against the inner wall of the box 1. The lower end of this cylinder 5 rests on the rim 4 of the bulb glass and the top end abuts against the top plane 6 of the top element or cover 7. In this way the bulb glass 2 is enclosed between the bottom plane 8 of the box 1 and the top plane 6 of the cover 7 by the intermediary of the cylinder 5.

The top plane 6 has an opening 9 in the centre thereof, viz. in the axis of and above the bulb glass 2, when placed in the box. The part 3 of the side wall of the box surpassing the upper rim 4 of the bulb glass 2 and the cylinder 5 maintain the top element 6 and thereby the opening 9 at a distance from the top edge or rim 4 of the bulb glass 2. This distance is chosen so that it corresponds with the length that the bud 10 of the bulb should have at the time when the bulb glass with the bulb is to be put in full daylight.

So after the packing case has been used as a protection for the bulb glass on transport and as an attractive cover having considerable eye-appeal for delivery of the bulb glass to the user it is further adapted to be used as a growing container.

The user puts a bulb into the top part 11 of the bulb glass 2 as shown in Fig. 1, after this bulb glass has been filled with water about to the dotted line 12 indicated in Fig. 1.

Now the packing case with bulb glass and the bulb therein are put in some place where it is automatically under control, that is to say it is no longer necessary to put the bulb glass in full dark as the opening 9 admits only dimmed light.

Now the casing has indicator properties for the moment at which the bulb should be brought in full daylight. This is necessary at a time which is rather critical for full development of the flower according to the inherent qualities thereof. For hyacinth bulbs the right moment therefor is generally there when the bud has grown out to a length of about 8 cm. By predetermining now the distance between the top edge 11 of the bulb glass and the top plane 6 of the cover at about 8 cm. the top end of the bud will peep through the opening 9 when the time for taking out the bulb glass with bulb to bring it in full daylight has come. An only supervisional view of the packing case with its content shows immediately whether the bud peeps out of the opening.

Fig. 1 further shows that the way in which the top plane 6 of the cover 7 and the bottom 8 of the box 1 are kept in place provides for an elastic enclosure of the bulb glass.

For this purpose the edge 13 of the cylindrical sidewall 14 of the cover 7 as well as the lower edge 15 of the cylindrical side-wall of the box 1 are bent inwardly over 180° so that the planes 6 and 8 are kept at some distance from the outwardly extending rims 16 and 17, respectively, of the cover 7 and of the box 1. When the packing cases are stored one upon the other or other weights come upon the top of the packing cases these weights are received by the wall of the box and not transferred to the top and bottom planes 6 and 8 or to the bulb glass 2.

Figure 4:
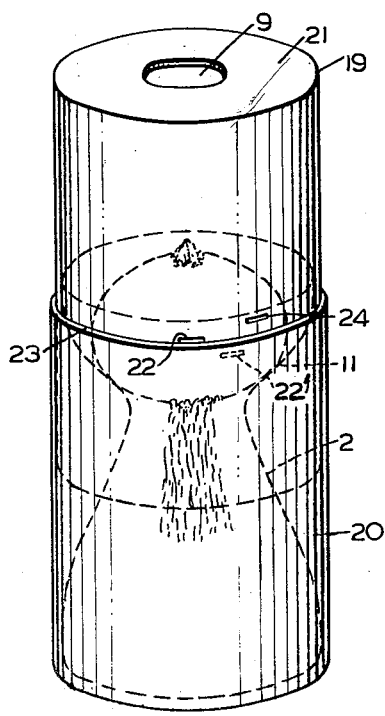
Fig. 4 is a perspective view of the same embodiment in the position wherein it is used for growing a bulb in the bulb glass.
Figure 3:
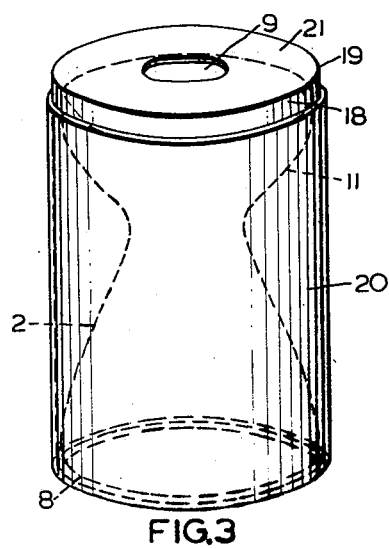
Fig. 3 is a perspective view of another embodiment in the position for transport of an enclosed bulb glass.

In the embodiment of Figs. 3 and 4 the side-wall 18 of the cover 19 fits snugly into the box 20. The cover and the box constitute elements telescoping one into the other. In the closed position of the cover, shown in Fig. 3, the side-wall 18 of the cover reaches to the bottom plane 8 of the box 20. In this position, wherein the packing case has its transport shape, the bulb glass 2 fits between the bottom plane 8 and the top plane 21 of the cover 19. The user fills the bulb glass 2 with water, places the bulb in the upper part 11 of the bulb glass and brings the cover 19 in the position shown in Fig. 4 wherein a mark 22 provided on the side wall 18 of the cover can just be seen above the rim 23 of the box 20. This mark 22 is at a distance of about 8 cm. from the top plane 21 of the cover, and an indication in printing may be placed on the side-wall telling the user that this mark is intended for hyacinth bulbs. Some other marks such as 22' and 24 may be provided at other distances from the top plane 20 for instance at 9 and 7 cm., a printed text telling for what kind of bulbs they are intended.

Figure 5:
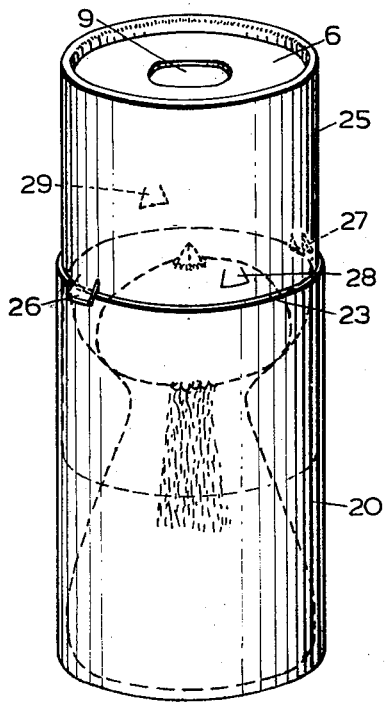
Fig. 5 is a perspective view of a modification of the embodiment shown in Figs. 3 and 4.

In the embodiment shown in Fig. 5 cover 25 constitutes a telescoping part within the box 20. In the sidewall of the cover 25 the marks shown in Fig. 4 are replaced by a series of incisions 26, 27, 28, 29 forming outwardly bendable lips. In Fig. 5 the lips 26 and 27 lying at the same height have been set out by the user on bringing the packing case from the transport position into the position for growing a bulb therein. The lips rest upon the rim 28 of the box 20 and maintain the top plane 6 of the cover 25 with the central opening 9 at a predetermined distance of about 8 cm. from the top edge of the bulb glass.

Figure 7:
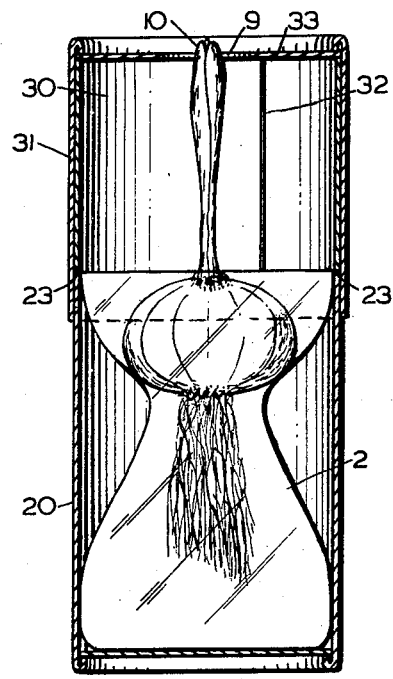
Fig. 7 shows an axial section through the last mentioned embodiment in the position for growing a bulb therein.
Figure 6:
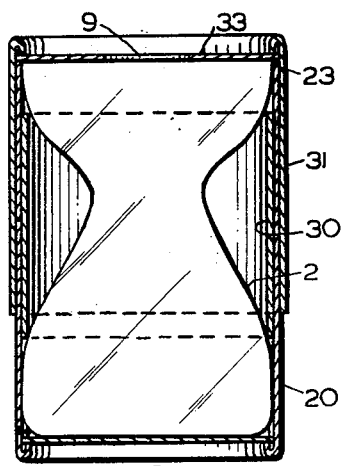
Fig. 6 is a vertical section along the axis of a further embodiment in the transport position.
Figure 8:
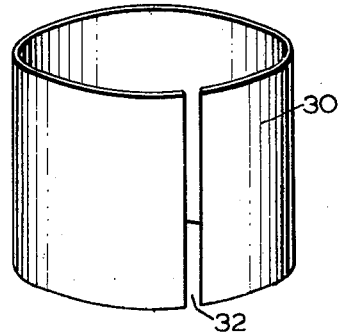
Fig. 8 is a perspective view of one of the parts used in the embodiment shown in Figs. 6 and 7.

In the modification illustrated in Figs. 6, 7 and 8 use is made of a cylindrical distance member 30, having a height corresponding to the predetermined distance of about 8 cm. at which the opening 9 of the cover 31 is to be brought when using the case as a growing container. The distance member 30, shown separately in Fig. 8 is a slit cylinder that may be made of the same material as the box 20 and cover 31, such as paste board. In the transport position of the packing case shown in Fig. 6 the cylinder 30 is placed within the box 20 around the bulb glass 2 and against the inner wall of the box. In this position the slit 32 is nearly closed. In the position for growing the bulb, shown in Fig. 7, the cylinder is placed between the upper rim 23 of the box 20 and the top plane 33 of the cover 31.

Modifications may be made in the invention as claimed hereinafter without departing from the spirit thereof.

What I claim is:

1. A packing comprising, in combination, a case and a bulb glass contained therein and adapted to have a bulb seated therein for transporting said bulb and sheltering said bulb for at least part of the growing period of the bulb, said case comprising, in combination, means defining a body portion to receive and support said bulb glass, said body portion having an open upper end, a cover portion for said body portion, said cover portion having a transverse web formed with a central aperture lying substantially in the longitudinal axis of said body portion when said cover portion is engaged with said body portion, and means for spacing said apertured web a predetermined distance above the upper end of the bulb glass contained in said body portion.

2. A packing case for a bulb glass as defined in claim 1, wherein said means for spacing said web is dimensioned to position the central aperture in said web approximately 8 cm. above the upper end of the bulb glass, and further comprising means for preventing the bulb glass from moving axially in said body portion.

3. A packing comprising, in combination, a case and a bulb glass contained therein and adapted to have a bulb seated therein for transport and for at least part of the growing period of the bulb, said case comprising, in combination, means defining a body portion to receive said bulb glass, said body portion having an open upper end, a cover portion for said body portion, said cover portion having a transverse web formed with a central aperture lying substantially in the longitudinal axis of said body portion when said cover portion is engaged with said body portion, said cover portion being slidable axially relatively to said body portion and being movable to an axially inner position into engagement with the upper end of said bulb glass and to an axially outer position for spacing said apertured web a predetermined distance above the bulb glass contained in said body portion.

4. A packing case for a bulb glass as defined in claim 3, wherein the cover portion and the body portion have side walls and the side wall of the cover portion is provided with a plurality of incisions defining outwardly bendable lips positioned to rest upon the upper edge of the side wall of the body portion for positioning the apertured web a predetermined distance above the upper end of the bulb glass.

5. A packing case for a bulb glass as defined in claim 3, further comprising a separate distance member having a height which corresponds to the predetermined distance to be maintained during the growing period between the central aperture and the upper end of the bulb glass, said distance member being adapted to be received in the body portion when the cover portion is in its axially inner position and being adapted to be placed on the upper end of the bulb glass when the cover portion is in its axially outer position.

6. A packing case for a bulb glass as defined in claim 5, wherein the distance member is a slit cylinder adapted to be placed in the cover against the side walls thereof between the upper edge of the body portion and the web of the cover portion when a bulb is grown in the bulb glass in the body portion.

7. A packing comprising, in combination, a case and a bulb glass contained therein and adapted to have a bulb seated therein to shelter said bulb during the first growing period of the flower bud, said case comprising, in combination, means defining a body portion to receive said bulb glass, said body portion having an open upper end, a cover portion for said body portion, said cover portion having a transverse web formed with a central aperture lying substantially in the longitudinal axis of said body portion, and a separate distance member for spacing said apertured web above the upper end of the bulb glass contained in the body portion, said distance member having a predetermined height and being seated on the rim of the bulb glass when the cover portion is in an axially outer position with the apertured web spaced said predetermined height above the rim of the bulb glass.

8. A packing as defined in claim 7 wherein said bulb glass comprises a top portion having a substantially hollow semi-spherical shape with its largest diameter uppermost to define an annular upper rim supporting said distance member, a lower portion having a diameter substantially equal to the diameter of said upper rim and being supported by said case, and an intermediate portion between said upper portion and said lower portion having a minimum diameter substantially equal to one-half the diameter of said upper rim, said intermediate portion merging with said lower portion to provide said lower portion with a substantially conical configuration, and a bulb seated in said bulb glass and being supported by the wall of said semi-spherical upper portion.

References Cited in the file of this patent

UNITED STATES PATENTS

| | | |
|---|---|---|
| 786,547 | Chamberlin | Apr. 4, 1905 |
| 1,493,152 | Gardner | May 6, 1924 |
| 1,545,640 | Dentraygues | July 14, 1925 |
| 2,064,707 | Wilson | Dec. 15, 1936 |
| 2,160,998 | Wilson | June 6, 1939 |